United States Patent
Santamaria-Pang et al.

(10) Patent No.: US 11,301,977 B2
(45) Date of Patent: Apr. 12, 2022

(54) SYSTEMS AND METHODS FOR AUTOMATIC DEFECT RECOGNITION

(71) Applicant: General Electric Company, Schenectady, NY (US)

(72) Inventors: Alberto Santamaria-Pang, Schenectady, NY (US); Yousef Al-Kofahi, Niskayuna, NY (US); Aritra Chowdhury, Albany, NY (US); Shourya Sarcar, Niskayuna, NY (US); Michael John MacDonald, Albany, NY (US); Peter Arjan Wassenaar, Morrow, OH (US); Patrick Joseph Howard, Cincinnati, OH (US); Bruce Courtney Amm, Clifton Park, NY (US); Eric Seth Moderbacher, San Diego, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/845,324

(22) Filed: Apr. 10, 2020

(65) Prior Publication Data
US 2021/0319544 A1    Oct. 14, 2021

(51) Int. Cl.
*G06K 9/00* (2006.01)
*G06T 7/00* (2017.01)
*G06K 9/62* (2022.01)

(52) U.S. Cl.
CPC ......... *G06T 7/0002* (2013.01); *G06K 9/6215* (2013.01); *G06K 9/6256* (2013.01);
(Continued)

(58) Field of Classification Search
CPC ......... G06T 7/0002; G06T 2207/20081; G06T 2207/20084; G06K 9/6215; G06K 9/6256
(Continued)

(56) References Cited

U.S. PATENT DOCUMENTS

| 4,896,278 A | 1/1990 | Grove et al. |
| 5,544,256 A | 8/1996 | Brecher et al. |

(Continued)

OTHER PUBLICATIONS

He, Yu, et al. "Semi-supervised defect classification of steel surface based on multi-training and generative adversarial network." Optics and Lasers in Engineering 122 (2019): 294-302. (Year: 2019).*

(Continued)

*Primary Examiner* — Jonathan S Lee
(74) *Attorney, Agent, or Firm* — Fitch, Even, Tabin & Flannery LLP

(57) ABSTRACT

An image inspection computing device is provided. The device includes a memory device and at least one processor. The at least one processor is configured to receive at least one sample image of a first component, wherein the at least one sample image of the first component does not include defects, store, in the memory, the at least one sample image, and receive an input image of a second component. The at least one processor is also configured to generate an encoded array based on the input image of the second component, perform a stochastic data sampling process on the encoded array, generate a decoded array, and generate a reconstructed image of the second component, derived from the stochastic data sampling process and the decoded array. The at least one processor is further configured to produce a residual image, and identify defects in the second component.

20 Claims, 6 Drawing Sheets

(52) U.S. Cl.
CPC ............... *G06T 2207/20081* (2013.01); *G06T 2207/20084* (2013.01)

(58) Field of Classification Search
USPC ........................................................ 382/159
See application file for complete search history.

(56) References Cited

U.S. PATENT DOCUMENTS

| | | | |
|---|---|---|---|
| 7,127,099 | B2 | 10/2006 | Noy et al. |
| 8,131,107 | B2 | 3/2012 | Sun et al. |
| 9,547,804 | B2* | 1/2017 | Nirenberg ............... H04N 19/60 |
| 9,984,283 | B2 | 5/2018 | Davatzikos et al. |
| 10,068,671 | B2 | 9/2018 | Dean et al. |
| 10,303,970 | B2* | 5/2019 | Nirenberg ............. G06K 9/4619 |
| 10,395,362 | B2* | 8/2019 | Gupta ...................... G06T 7/564 |
| 10,818,001 | B2* | 10/2020 | Leung .................... G06T 7/0004 |
| 10,964,013 | B2* | 3/2021 | Plihal ........................ G06K 9/20 |
| 11,144,814 | B2* | 10/2021 | Cha ........................... G06N 3/08 |
| 2003/0099330 | A1 | 5/2003 | Mery et al. |
| 2018/0374207 | A1 | 12/2018 | Niculescu-Mizil et al. |
| 2019/0197368 | A1 | 6/2019 | Madani et al. |

OTHER PUBLICATIONS

Mei, Shuang, Hua Yang, and Zhouping Yin. "An unsupervised-learning-based approach for automated defect inspection on textured surfaces." IEEE Transactions on Instrumentation and Measurement 67.6 (2018): 1266-1277. (Year: 2018).*

Wang, Jinjiang, Peilun Fu, and Robert X. Gao. "Machine vision intelligence for product defect inspection based on deep learning and Hough transform." Journal of Manufacturing Systems 51 (2019): 52-60. (Year: 2019).*

Wei, Taoran, et al. "A simulation-based few samples learning method for surface defect segmentation." Neurocomputing 412 (2020): 461-476. (Year: 2020).*

Jiange Iiu, Tao Feng, Xia Fang, Sisi Huang, and Jie Wang, An Intelligent Vision System for Detecting Defects in Micro-Armatures for Smartphones, Applied Sciences, May 28, 2019, 12 pages, www.mdpi.com/journal/applsci.

Shuang Mei, Yudan Wang, Guojun Wen, Automatic Fabric Defect Detection with a Multi-Scale Convolutional Denoising Autoencoder Network Model, Sensors, Apr. 12, 2018, 18 pages, www.mdpi.com/journal/sensors.

Changhang Xu, Jing Xie, Changwei Wu, Lemei Gao, Guoming Chen, and Gangbing Song, Enhandng the Visibility of Delamination during Pulsed Thermography of Carbon Fiber-Reinforced Plates Using a Stacked Autoencoder, Sensors, Aug. 25, 2018, 15 pages, www.mdpi.com/journal/sensors.

Mei Zhang, Jinglan Wu, Huifeng Lin, Peng Yuan, Yanan Song, The Application of One-Class Classifier Based on CNN in Image Defect Detection, Elsevier Ltd., Nov. 1, 2017, 18 pages, www.elsevier.com/locate/procedia.

Shengping Wen, Zhihong Chen, Chaoxian Li, Vision-Based Surface Inspection System for Bearing Rollers Using Convolutional Neural Networks, Applied Sciences, Dec. 11, 2018, 19 pages, www.mdpi.com/journal/applsci.

N.B. Yahia, T. Belhadj, S. Brag, A Zghal, Automatic Detection of Welding Defects Using Radiography with a Neural Approach, Elsevier Ltd., 2011, 9 pages, www.elsevier.com/locate/procedia.

F. Herold, K. Bavendiek, and R. Grigat, A Third Generation Automatic Defect Recognition System, Research Gate, Dec. 20, 2014, 9 pages, www.researchgate.net/publication/264846705.

Ehab A. Kholief, Samy H. Darwish, M. Nashat Fors, Detection of Steel Surface Defect Based on Machine Learning Using Deep Auto-Encoder Network, Proceedings of the International Conference on Industrial Engineering and Operation Management, Rabat, Morocco, Apr. 11-13, 2017, 13 pages, www.researchgate.net/publication/331872197.

Yongho Yoo, Ue-Hwan Kim, and Jong-Hwan Kim, Convolution Recurrent Reconstructive Network for Spatiotemporal Anomaly Detection in Solder Paste Inspection, arXiv:1908/08204v1, Aug. 22, 2019, 11 pages, IEEE.

M. Haselmann, D.P. Gruber, P. Tabatabai, Anomaly Detection Using Deep Learning Based Image Completion, arXiv:1811.06891v1, 17th International Conference on Machine Learning and Applications (ICMLA), Nov. 16, 2018, 6 pages, IEEE.

Emily A. Donahue, Tu-Thach Quach, Kevin Potter, Cart Martinez, Matthew Smith and Christian D. Turner, "Deep Learning for Automated Defect Detection in High Reliability Electronic Parts", Sandia National Laboratories, Albuquerque, NM, vol. 11139, 2019, 11 pages.

M. Haselmann, D.P. Gruber, "Supervised Machine Learning Based Surface Inspection by Synthetizing Artificial Defects", 2017, 16th IEEE International Conference on Machine Learning and Applications, Leoben Austria, 6 pages.

A. Gayer, A. Shaya and A. Shiloh, "Automatic Recognition of Welding Defects in Real-Time Radiography", NDT International vol. 23 No. 3, Jun. 1990, Butterworth-Heinemann Ltd., 6 pages.

"Automated Defect Recognition for 24/7 Automated In-Line Inspection", VisiConsult, X-ray Systems & Solutions, 1 page, www.visiconsult.com.

M. Haselmann and D.P. Gruberl, "Pixel-Wise Defect Detection by CNNs without Manually Labeled Training Data", 2019, vol. 33, No. 6, 548-566; Mar. 5, 2019.

Chollet Francois: "Deep Learning with Python", In: "Deep Learning with Python", Dec. 22, 2017 (Dec. 22, 2017), Manning Publications, XP055819652, pp. 1-386.

Kim Min Su, et al: "Unsupervised Anomaly detection of LM Guide Using Variational Autocoder", 2019 11th International Symposium On Advanced Topics in Electrical Engineering (ATEE), IEEE, Mar. 28, 2019 (Mar. 28, 2019), pp. 1-5, XP033553369, DOI: 10.1109/ATEE.2019.8724998.

* cited by examiner

SYSTEMS AND METHODS FOR AUTOMATIC DEFECT RECOGNITION

BACKGROUND

The field of the invention relates generally to systems and methods for inspecting a component, and more particularly to systems and methods for automatically detecting defects in a component.

At least some known methods of component inspection require manual (e.g., human expert) inspection subject to the subjective interpretation of the human expert. Further systems and methods for detecting defects utilize and require large amounts of sample data to enable an inspection system to recognize what a defect looks like in a component. In other words, some systems learn what defects in components look like by receiving large amounts of sample data, and identifying defects in the defective samples of the sample data. Often, classifiers are assigned to defects in components so a system can learn what a defect looks like. However, the amount of defective samples is generally much less than the amount of conforming samples, and it may be relatively difficult to find a sample of each possible defect that could occur in a component because the variety of possible defects that may occur in a component can vary widely. Further, known trained solutions will only detect defects that were represented in training data (e.g., defective samples). Defects not represented in training data will not be detected by known solutions.

Accordingly, there is a need for inspection systems that can be trained without requiring a large quantity of defective samples, while also improving the efficiency of detecting defects in components.

BRIEF DESCRIPTION

In one aspect, a method for inspecting a component using an image inspection controller, including a processor communicatively coupled to memory, is provided. The method includes receiving, at the processor, at least one sample image of a first component, wherein the at least one sample image of the first component does not include defects, storing, in the memory, the at least one sample image, and receiving, at the processor, an input image of a second component. The method also includes generating, by the processor, an encoded array based on the input image of the second component, performing, by the processor, a stochastic data sampling process on the encoded array, and generating, by the processor, a decoded array from the stochastic data sampling process, based at least in part on the at least one sample image. The method further includes generating, by the processor, a reconstructed image of the second component, derived from the stochastic data sampling process and the decoded array, that is generated based at least in part on the at least one sample image, comparing, by the processor, the reconstructed image of the second component to the input image of the second component, producing, by the processor, a residual image that, if the second component has defects, includes at least one difference between the reconstructed image of the second component and the input image of the second component, and identifying, by the processor, whether or not the second component has defects based on the residual image.

In another aspect, an image inspection computing device is provided. The image inspection computing device includes a memory device and at least one processor communicatively coupled to the memory device. The at least one processor is configured to receive at least one sample image of a first component, wherein the at least one sample image of the first component does not include defects, store, in the memory, the at least one sample image, and receive an input image of a second component. The at least one processor is also configured to generate an encoded array based on the input image of the second component, perform a stochastic data sampling process on the encoded array, generate a decoded array from the stochastic data sampling process, based at least in part on the at least one sample image, and generate a reconstructed image of the second component, derived from the stochastic data sampling process and the decoded array, that is generated based at least in part on the at least one sample image. The at least one processor is further configured to compare the reconstructed image of the second component to the input image of the second component, produce a residual image that, if the second component has defects, includes at least one difference between the reconstructed image of the second component and the input image of the second component, and identify defects in the second component based on the residual image.

In yet another aspect, a non-transitory computer-readable storage media having computer-executable instructions embodied thereon is provided. When executed by a computing device including at least one processor in communication with a memory, the computer-executable instructions cause the computing device to receive at least one sample image of a first component, wherein the at least one sample image of the first component does not include defects, store, in the memory, the at least one sample image, receive an input image of a second component, and generate an encoded array based on the input image of the second component. The computer-executable instructions further cause the computing device to perform a stochastic data sampling process on the encoded array, generate a decoded array from the stochastic data sampling process, based at least in part on the at least one sample image, and generate a reconstructed image of the second component, derived from the stochastic data sampling process and the decoded array, that is generated based at least in part on the at least one sample image. The computer-executable instructions further cause the computing device to compare the reconstructed image of the second component to the input image of the second component, produce a residual image that, if the second component has defects, includes at least one difference between the reconstructed image of the second component and the input image of the second component, and identify defects in the second component based on the residual image.

DETAILED DESCRIPTION

Figure 1:
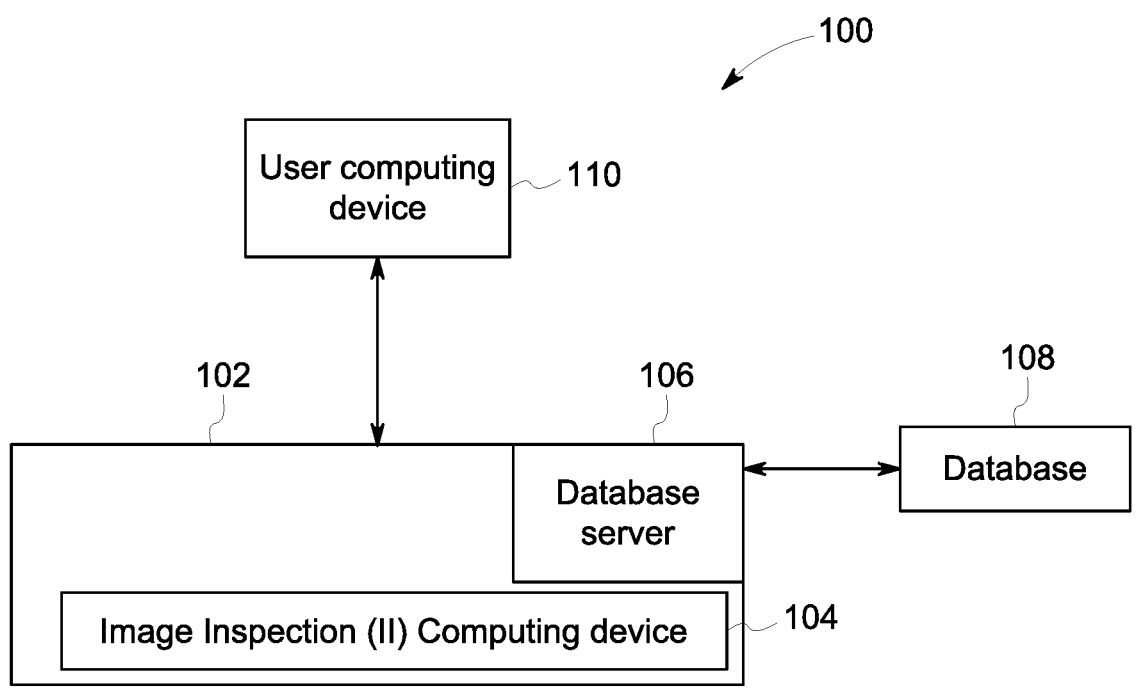
FIG. 1 is a schematic diagram illustrating an example image inspection (II) computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Described herein are systems and methods for automatic defect recognition. The systems and methods described herein detect defects automatically by receiving sample input images of components that do not contain defects. These sample input images, and normal data derived from the sample images, are used to reconstruct an input image (2D or 3D, for example) of a component to be inspected. The reconstructed image is then compared with the input image of the component to be inspected to create a residual image, highlighting defects in the input image of the component. Instead of requiring many sample images of components with defects and comparing those images with an input image of a component to detect defects in the component, the systems and methods described herein utilize at least one sample input image of a component having no defects. This greatly lessens the time, cost, and inaccuracies associated with trying to find a sample input image for every possible defect that could occur in a component.

The technical problems addressed by the disclosure include at least one of: (a) subjectivity of manually inspecting components; (b) a labor-intensive process of designing and integrating data augmentation strategies during defect detection; (c) a time-consuming process of labeling defect data to train a defect detection system; (d) a large quantity of defective samples used to train a defect detection system; (e) heavy data augmentation that limits the variability of known systems and methods for defecting defects; (f) requiring pre-processing of images, such as denoising; and (g) only detecting defects represented as defects in training data or defective samples.

The technical effects achieved by the systems and methods described herein include at least one of: (a) receiving, at a processor, at least one sample image of a first component, wherein the at least one sample image of the first component does not include defects; (b) storing, in a memory, the at least one sample image; (c) receiving, at the processor, an input image of a second component; (d) generating, by the processor, an encoded array based on the input image of the second component; (e) performing, by the processor, a stochastic data sampling process on the encoded array; (f) generating, by the processor, a decoded array from the stochastic data sampling, based at least in part on the at least one sample image; (g) generating, by the processor, a reconstructed image of the second component, derived from the stochastic data sampling and the decoded array, that is generated based at least in part on the at least one sample image; (h) comparing, by the processor, the reconstructed image of the second component to the input image of the second component; (i) producing, by the processor, a residual image that, if the second component has defects, includes at least one difference between the reconstructed image of the second component and the input image of the second component; and (j) identifying, by the processor, whether or not the second component has defects based on the residual image.

The resulting technical benefits achieved by the systems and methods of the disclosure include at least one of: (a) automatically inspecting components; (b) removing the labor-intensive process of designing and integrating data augmentation strategies during defect detection; (c) removing the time-consuming process of labeling defect data to train defect detection system; (d) no defective samples are needed to train defect detection system; (e) no heavy data augmentation is required, thereby creating variability of the systems and methods described herein; (f) no denoising or image pre-processing required; and (g) detecting all defects and not requiring defective samples.

FIG. 1 is a schematic diagram illustrating an example image inspection (II) computing system 100 for automatically detecting defects in a component.

II computing system 100 includes a server 102, including at least one II computing device 104 and a database server 106, wherein II computing device 104 (i.e., an image inspection controller) is in communication with at least one database 108 and at least one user computing device 110.

In the example embodiment, user computing device 110 (e.g., a smartphone, tablet, laptop, etc.) is configured to transmit inputs to II computing device 104, such as sample component images. In the example embodiment, sample component images include images of a component having no defects. User computing device 110 is also configured to receive outputs from II computing device 104, such as a residual image 210 (shown in FIG. 2A).

Database server 106 may be in communication with database 108, which contains information on a variety of matters, as described below in greater detail. In one embodiment, database 108 is stored on server 102 and may be accessed by logging onto server 102 and/or II computing device 104 through user computing device 110. In another embodiment, database 108 may be stored remotely from server 102 and may be non-centralized. In some embodiments, database 108 may be distributed across a plurality of locations (e.g., server 102, database 108, etc.), and/or exist in a cloud environment.

In the example embodiment, II computing device 104 is configured to receive images of sample components and/or subject components, and determine defects in any subject components received, as is described below in greater detail. Images received and used by II computing device 104 to determine defects may be 2D or 3D images. Notably, II computing device 104 is configured to determine defects by using normal data (e.g., conforming data) and does not require any manipulating of input images, manually augmenting of image data, and/or defect labeling of image data.

Figure 2A:
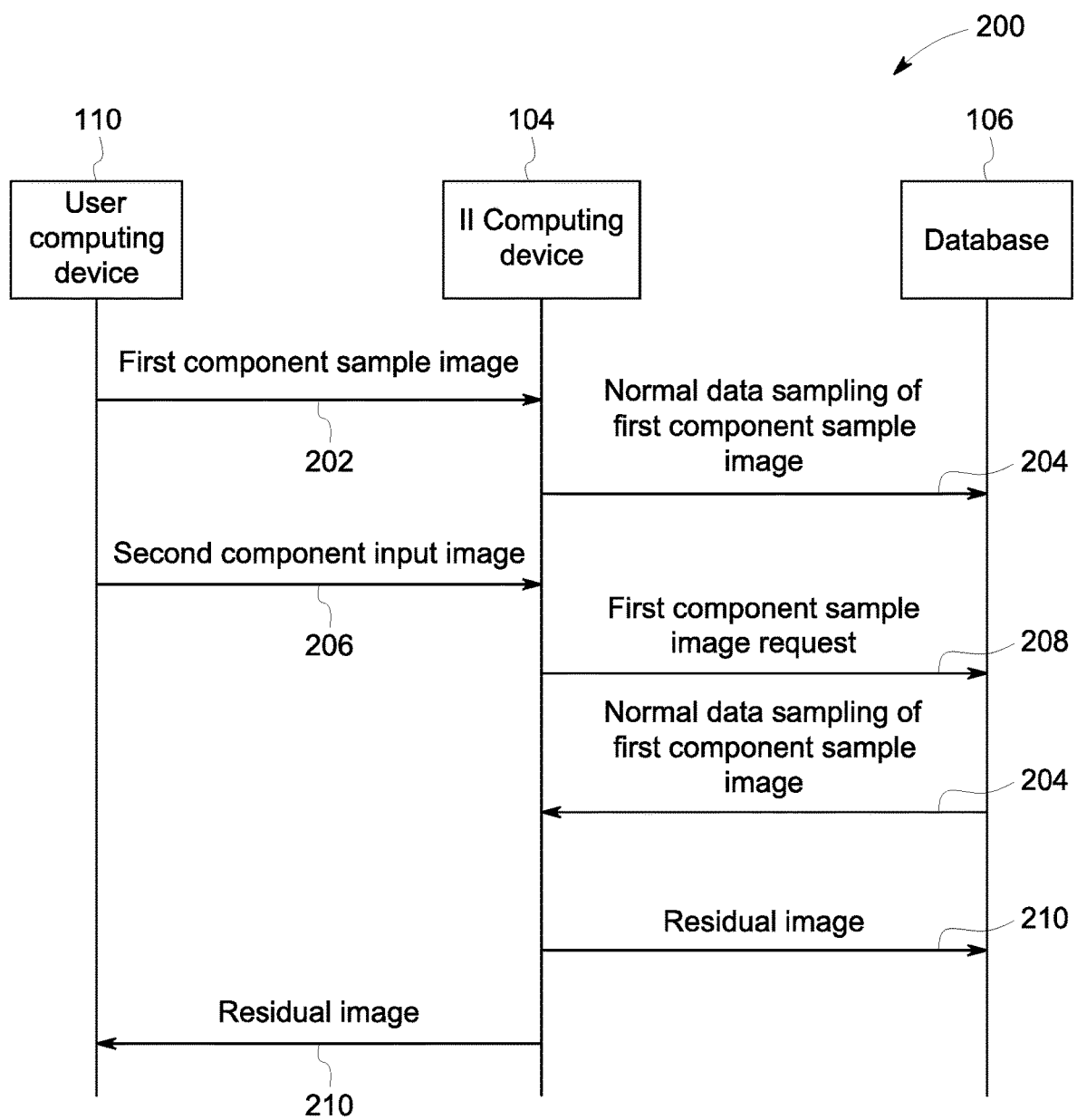
FIG. 2A is a diagram of an example data flow illustrating the detection of defects, as implemented using the II computing system shown in FIG. 1.

FIG. 2A is a diagram of an example data flow 200 illustrating the detection of defects, as implemented using II computing system 100 shown in FIG. 1.

In the example embodiment, user computing device 110 is configured to transmit a first component sample image 202 of a first component to II computing device 104. First component sample image 202 includes a sample image of a component having no defects. In some embodiments, a plurality of sample images of components having no defects may be transmitted from user computing device 110 to II computing device 104. Using a plurality of sample images (as opposed to a single sample image) may be beneficial by demonstrating minor differences between sample images that are not defects, but that may include minor manufacturing variations that are not in fact defects. Upon receiving first component sample image 202 from user computing device 110, II computing device 104 is configured to generate a normal data sampling of the first component sample image 204, and transmit normal data sampling of the first component sample image 204 to database 108 such that normal data sampling of the first component image 204 is stored in database 108.

II computing device 104 is configured to then receive a second component input image 206 of a second component from, in the example embodiment, user computing device 110. Second component image 206 is an image of a component similar to first component sample image 202. However, the second component associated with second component image 206 may include defects. Accordingly, II computing device 104 is configured to automatically detect defects in second component image 206.

In the example embodiment, II computing device 104 is configured to generate a reconstructed image of second component input image 206, such that the reconstructed image can be compared with second component input image 206 to detect defects in the second component. II computing device 104 uses normal data sampling of the first component sample image 204 to generate the reconstructed image. Thus, II computing device 104 is configured to, upon receipt of second component input image 206, generate and transmit a first component sample image request 208 to database 108. Database 108 is configured to then transmit normal data sampling of the first component sample image 204 to II computing device 104.

Figure 2B:
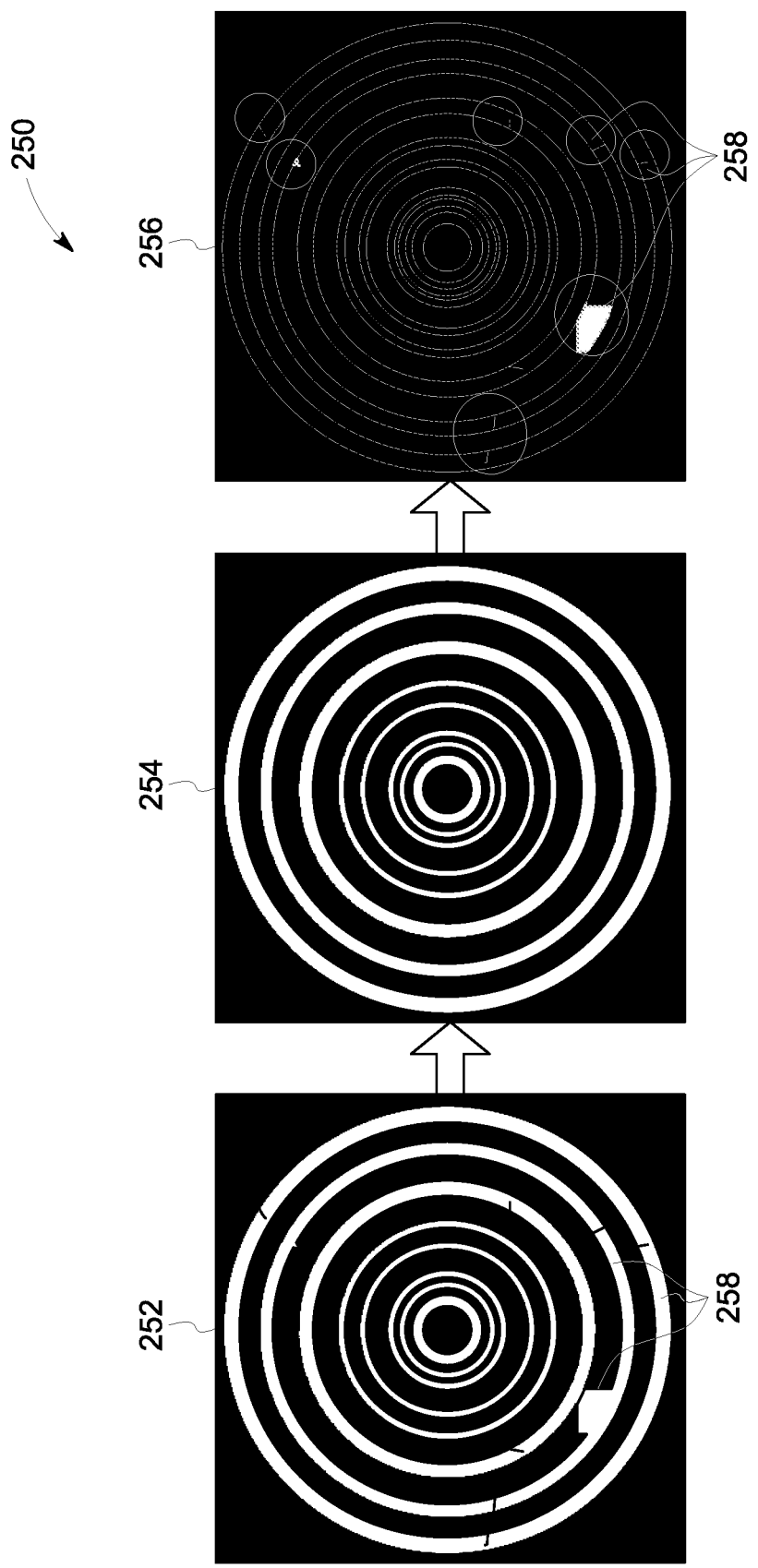
FIG. 2B is a diagram of an example defect detection process, as implemented using the II computing system shown in FIG. 1.

FIG. 2B is a diagram of an example defect detection process 250, as implemented using II computing system 100 shown in FIG. 1. In the example embodiment, II computing device 104 is configured to generate a reconstructed image 254 of a second component based on a stochastic process performed on a second component input image 252 using normal data sampling of the first component sample image 204. For example, second component input image 252 includes defects 258 in the second component. In order to detect defects 258, II computing device 104 generates reconstructed image 254 of the second component by stochastically using normal data sampling of the first component sample image 204 to cure defects 258 in second component input image 252. Reconstructed image 254 is then compared with second component input image 252 in order to detect defects 258. Notably, reconstructed image 254 does not contain defects.

In the example embodiment, II computing device 104 determines defects in second component input image 252 in a two-step process. First, a residual image 256 (also referred to as a similarity map and/or similarity index) is generated by comparing second component input image 252 to reconstructed image 254. The comparison may be performed by using the following equation, for example:

$$S\_m = \text{SIMILARITY}(I, g(I))$$

wherein I represents second component input image 252, g(I) represents reconstructed image 254, SIMILARITY is an operator to estimate the similarity between second component input image 252 and reconstructed image 254, and S_m represents residual image/similarity map 256. Residual image 256 is then used by II computing device 104 to determine if there are any defects 258 in second component input image 252. In some examples, second component input image 252 may include no defects. In the example embodiment shown in FIG. 2B, second component input image 252 includes at least seven defects as shown in residual image 256, three of which are noted as defects 258. II computing device 104 determines defects in second component input image 252 by classifying portions of residual image 256 that are "high" (brighter areas), which may contain defects, while portions of residual image 256 that are "low" (i.e., darker areas) as not containing defects. In order to determine which of the high (i.e., brighter) areas contain defects, a quality index may be generated by II computing device 104.

A quality index may be generated by II computing device 104 by, for example, using the following equation:

$$Q\_I = \text{ImageQI}(S\_m)$$

wherein S_m is the previously generated similarity map, ImageQI is an operator to estimate a quality index, and QI is a quality index. The quality index may include, for example, values in the range of zero to ten, such that low values represent lower quality and higher values represent higher quality. Lower values in the quality index indicate a higher likelihood of the corresponding portion of residual image 256 containing a defect.

In some embodiments, II computing device 104 may determine an acceptance threshold to be used with the quality index. The acceptance threshold is determined for a component such that portions of the residual image with quality index scores above the acceptance threshold are determined by II computing device 104 to not have defects, while portions of the residual image with quality index scores below the acceptance threshold are determined by II computing device 104 to have defects. In some embodiments, if a quality index score is equal to the predetermined threshold, the associated portion of the residual image may be determined to have defects. In other embodiments, if a quality index score is equal to the predetermined threshold, the associated portion of the residual image may be determined to not have defects.

Quality index scores may be determined for the residual image as a whole, for each individual pixel in the residual image, and/or for portions of pixels in the residual image. In some embodiments, a quality index score may be determined first for the image as a whole, and then for portions of the residual image if the quality index score is below a certain threshold in order to determine which specific areas of the residual image contain defects. This narrowing process may be is repeated until specific portions of the residual image are identified as containing defects.

A threshold value to be used with quality index scores may be entered manually by a user at user computing device 110 in communication with II computing device 104, or automatically determined by II computing device 104. In embodiments where II computing device 104 determines the threshold value, II computing device 104 may determine the threshold value by comparing quality index scores for portions of sample image 202 having no defects, with portions of an image having defects. II computing device 104 is configured, in these embodiments, to determine a threshold value such that a quality score associated with a pixel and/or group of pixels with relatively minor defects will be greater than the threshold value. Accordingly, minor manufacturing defects will not be determined by II computing device 104 to be defects because the quality score associated with the pixel and/or group of pixels will be greater than the threshold value. In some examples, if sample image 202 has generally low quality scores associated therewith, the threshold value may be lower due to sample image 202 not having defects but still having low quality scores. In other examples, if the sample image 202 has generally high quality scores associated therewith, the threshold value may be higher.

Referring back to FIG. 2A, upon determining if residual image 210 contains defects, II computing device 104 is configured to transmit residual image 210 to user computing device 110 and database 108. In some embodiments, II computing device 104 may be configured to markup residual image 210 to identify defects as shown in residual image 256 in FIG. 2B. In some embodiments, II computing device 104 may transmit a signal to user computing device 110 indicating residual image 210 contains defects.

Figure 3:
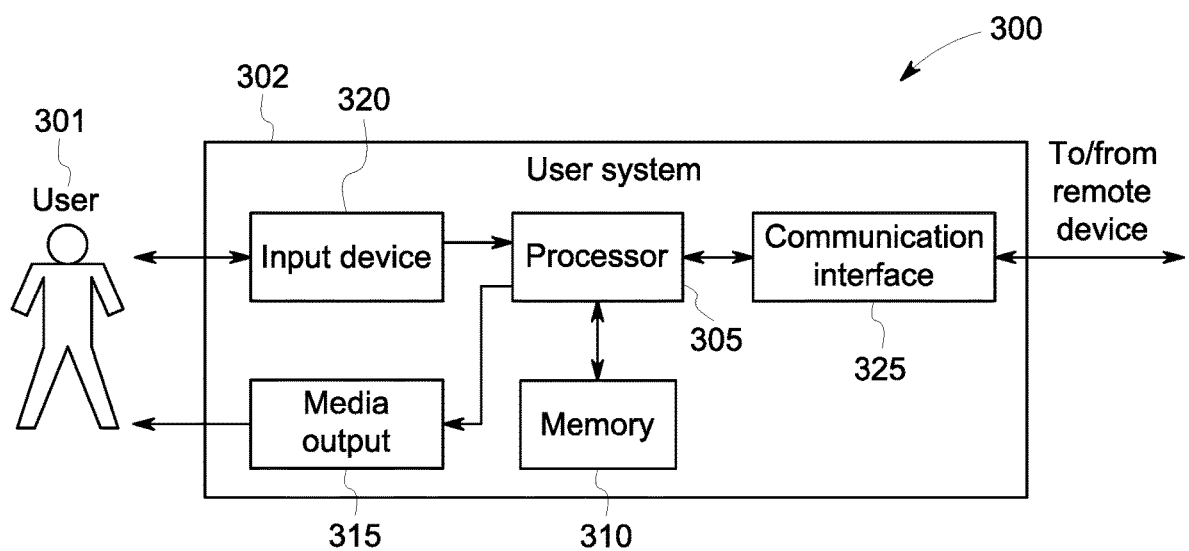
FIG. 3 is a block diagram of an example user computing device that may be used in the II computing system shown in FIG. 1.

FIG. 3 illustrates an example configuration of a user system 302 that may be operated by a user 301. In the example embodiment, user system 302 is similar to user computing device 110 (shown in FIG. 1), and may be used by user 301 to interact with II computing device 104 (also shown in FIG. 1). More specifically, user system 302 may be used by user 301 to, for example, transmit first component sample image 202 and second component input image 206 (both shown in FIG. 2). In the example embodiment, user system 302 includes a processor 305 for executing instructions. In some embodiments, executable instructions are stored in a memory area 310. Processor 305 may include one or more processing units, for example, a multi-core configuration. Memory area 310 may include one or more computer readable media.

User system 302 also includes at least one media output component 315 for presenting information to user 301, such as for example, residual image 210. Media output component 315 is any component capable of conveying information to user 301. In some embodiments, media output component includes an output adapter such as a video adapter and/or audio adapter. An output adapter is operatively coupled to processor 305 and operatively couplable to an output device such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 315 and input device 320. User system 302 may also include a communication interface 325, which is communicatively couplable to a remote device, such as II computing device 104. Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from II computing system 100.

Figure 4:
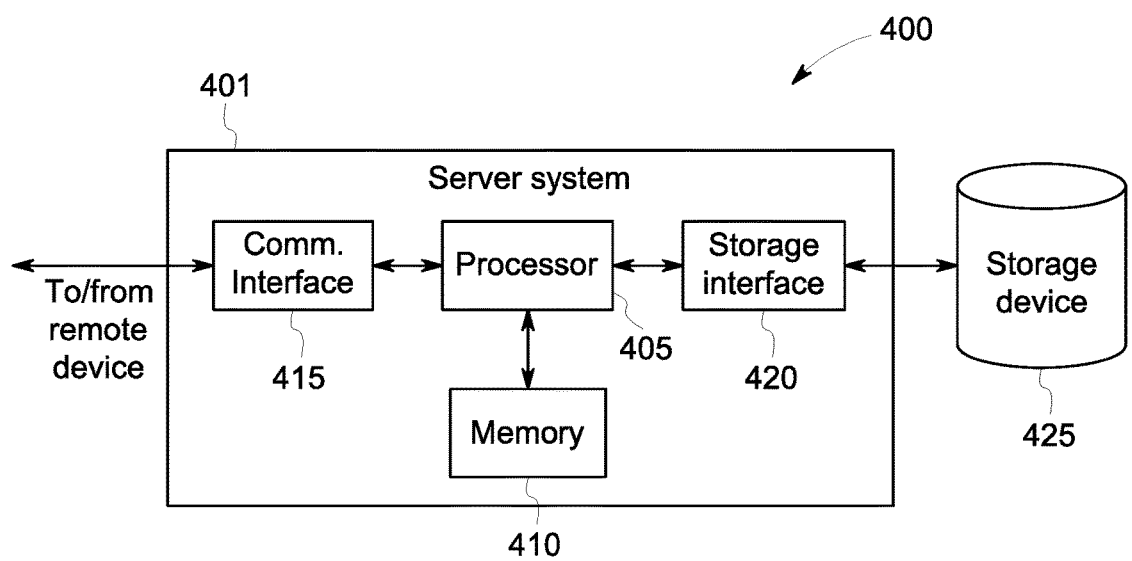
FIG. 4 is a block diagram of an example server computing system that may be used in the II computing system shown in FIG. 1.

FIG. 4 illustrates an example configuration of a server system 401. Server system 401 may include, but is not limited to, II computing device 104 (shown in FIG. 1). Server system 401 includes a processor 405 for executing instructions. Instructions may be stored in memory area 410, for example. Processor 405 may include one or more processing units (e.g., in a multi-core configuration) for executing instructions. The instructions may be executed within a variety of different operating systems on server system 401, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device such as user system 302 (shown in FIG. 3) or another server system 401. For example, communication interface 415 may receive requests from user computing device 110 via the Internet.

Processor 405 may also be operatively coupled to a storage device 425. Storage device 425 is any computer-operated hardware suitable for storing and/or retrieving data. In some embodiments, storage device 425 is integrated in server system 401. For example, server system 401 may include one or more hard disk drives as storage device 425. In other embodiments, storage device 425 is external to server system 401 and may be accessed by a plurality of server systems 401. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 is operatively coupled to storage device 425 via a storage interface 420. Storage interface 420 is any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Memory area 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
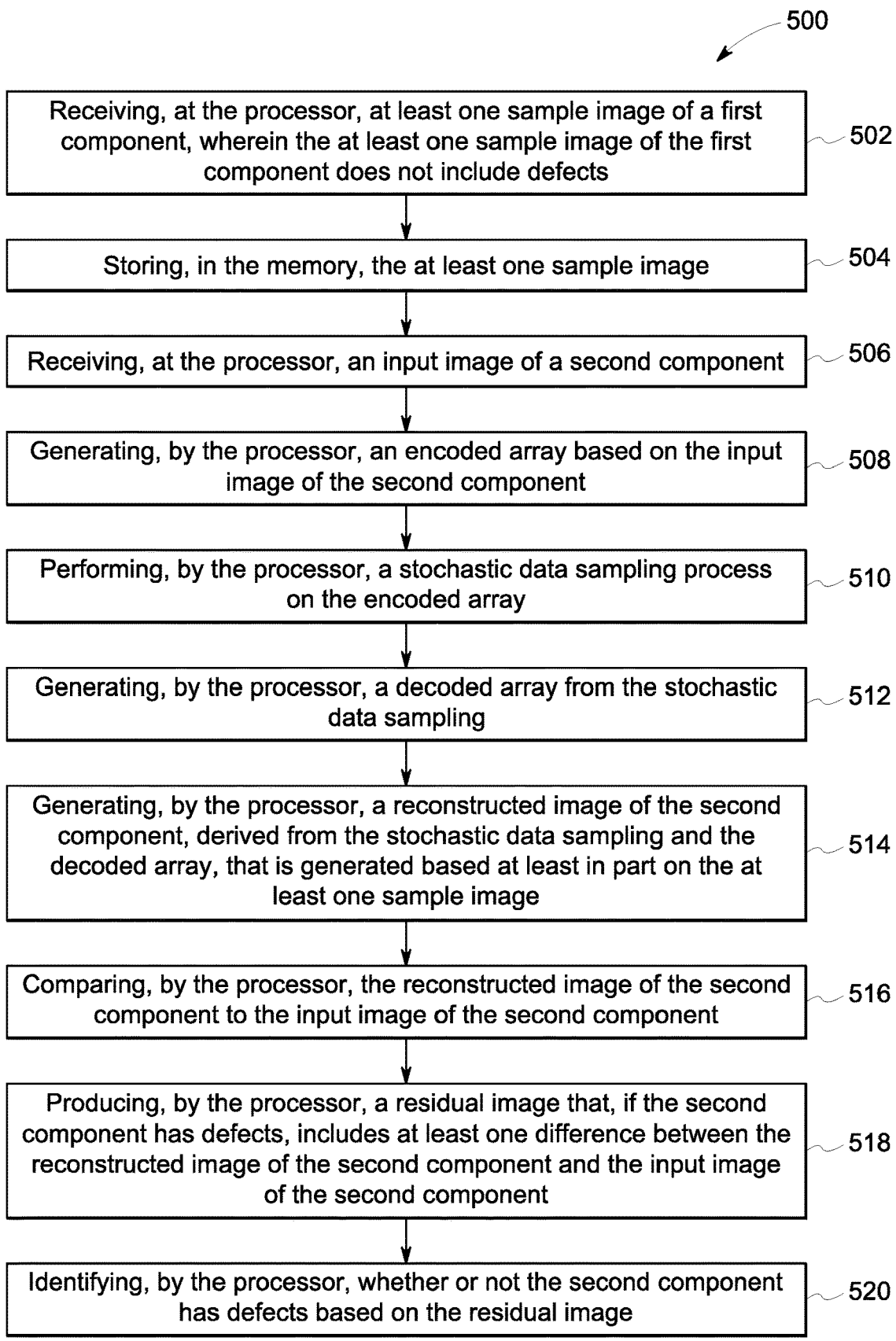
FIG. 5 is a flow diagram of an example method for automatically detecting defects in accordance with the present disclosure.

FIG. 5 is a flow diagram of an example method 500 for automatically detecting defects in accordance with the present disclosure.

In the example embodiment, method 500 includes receiving 502 at least one sample image of a first component 202, wherein the at least one sample image of the first component 202 does not include defects, and storing 504 in a memory (e.g., database 108) the at least one sample image 202. Method 500 further includes receiving 506 an input image of a second component 206/252, generating 508 an encoded array based on the input image of the second component 206/252, performing 510 a stochastic data sampling process on the encoded array, and generating 512 a decoded array from the stochastic data sampling.

In some embodiments, generating 508 an encoded array based on an input image may be performed by an encoder component included in II computing device 104 by using a lower dimensional image than an input image (e.g., using 2D representations of an input 3D image). Then, a stochastic data sampling process is introduced to modify the encoded array such that the encoded array is formatted properly to be used in machine learning techniques as described below (e.g., for backpropagation). After the stochastic data sampling process is performed, a latent variable may be estimated that is used by a decoding component included in II computing device 104 in order to generate 512 a decoded array. Thus, at least in part because of the stochastic data sampling process described above, the systems and methods described herein may include active machine learning techniques (e.g., as described below), as opposed to known systems and methods that require memorization of defective data from defective sample images.

Method 500 also includes generating 514 a reconstructed image 254 of the second component, derived from the stochastic data sampling and the decoded array, that is generated based at least in part on the at least one sample image 202 and comparing 516 the reconstructed image 254 of the second component to the input image of the second component 206/252. Method 500 further includes producing 518 a residual image 256 that, if the second component has defects, includes at least one difference between the reconstructed image 254 of the second component and the input image of the second component 206/252, and identifying 520 whether or not the second component has defects based on the residual image 256.

In some embodiments of method 500, comparing 516 the reconstructed image 254 of the second component to the input image of the second component 206/252 further includes comparing pixels of the reconstructed image 254 of the second component with pixels of the input image of the second component 206/252. In these embodiments, method 500 further includes calculating, based on comparing the pixels of the reconstructed image 254 and pixels of the input image 206/252, a similarity index that represents an estimated similarity between the pixels of the reconstructed image 254 and the pixels of the input image 206/252 and generating, from the similarity index, a quality index including a quality score of at least one pixel in the residual image 256. Further in method 500, identifying 520 whether or not the second component has defects may include identifying at least one pixel of the residual image 256 having a quality score below a threshold value and determining the threshold value by comparing quality scores for at least one reference pixel of the at least one sample image 202 to quality scores for at least one corresponding reference pixel in an image having at least one defect. In these embodiments method 500 may also include determining the threshold value such that the quality score for pixels associated with relatively minor defects will be greater than the threshold value. In some embodiments, method 500 includes applying a trained model to the residual image to determine if the second component has defects.

Figure 6:
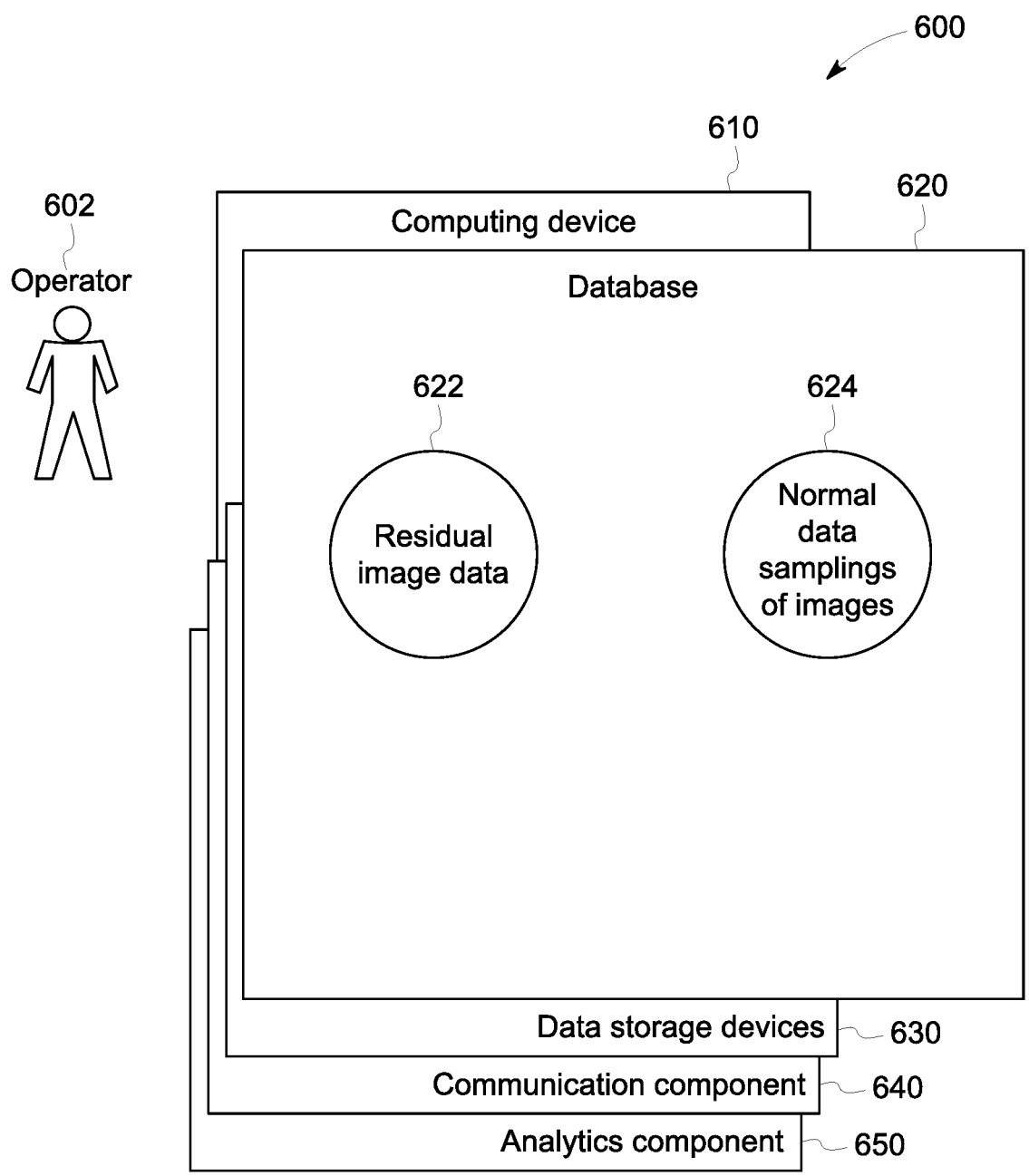
FIG. 6 is a diagram of components of one or more example computing devices that may be used in the II computing system shown in FIG. 1.

FIG. 6 is a diagram 600 of components of one or more example computing devices that may be used in II computing system 100 shown in FIG. 1. In some embodiments, computing device 610 may be used to implement II computing device 104. The computer components may be used to, for example, identify 520 whether or not the second component has defects (shown in FIG. 5). An operator 602 (such as a user operating II computing device 104) may access computing device 610 in order to initiate various operations and/or service computing device 610. In some embodiments, database 620 is similar to database 108, as shown in FIG. 1. Database 620 may be implemented on one or more data storage devices 630 and coupled with several components within computing device 610, which perform specific tasks. In the example embodiment, database 620 includes residual image data 622 and normal data samplings of images 624.

In the example embodiment, computing device 610 includes a communication component 640 programmed to, as examples, receive 502 at least one image of a first component 202, receive 506 an input image of a second component 206, and transmit a residual image 210 (as shown in FIGS. 2 and 5).

In the example embodiment, computing device 610 further includes an analytics component 650 to, for example, identify 520 whether or not the second component has defects based on the residual image 256.

Exemplary embodiments of systems and methods for identifying defects of a component are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models (e.g., models to be applied to data to determine if a component has defects), as an example.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for inspecting a component using an image inspection controller that includes a processor communicatively coupled to memory, said method comprising:
receiving, at the processor, at least one sample image of a first component, wherein the at least one sample image of the first component does not include defects;

receiving, at the processor, an input image of a second component;
generating, by the processor, an encoded array based on the input image of the second component;
performing, by the processor, a stochastic data sampling process on the encoded array;
generating, by the processor, a decoded array from the stochastic data sampling process, based at least in part on the at least one sample image;
generating, by the processor, a reconstructed image of the second component, derived from the stochastic data sampling process and the decoded array, that is generated based at least in part on the at least one sample image; and
comparing, by the processor, the reconstructed image of the second component to the input image of the second component to produce a residual image that, if the second component has defects, includes at least one difference between the reconstructed image of the second component and the input image of the second component.

2. A method in accordance with claim 1, wherein comparing the reconstructed image of the second component to the input image of the second component further comprises comparing, by the processor, pixels of the reconstructed image of the second component with pixels of the input image of the second component.

3. A method in accordance with claim 2, further comprising calculating, based on comparing the pixels of the reconstructed image and the pixels of the input image, a similarity index that represents an estimated similarity between the pixels of the reconstructed image and the pixels of the input image.

4. A method in accordance with claim 3, further comprising generating, from the similarity index, a quality index including a quality score of at least one pixel in the residual image.

5. A method in accordance with claim 4, further comprising identifying defects in the second component by identifying at least one pixel of the residual image having a quality score below a threshold value.

6. A method in accordance with claim 5, further comprising determining the threshold value by comparing quality scores for at least one reference pixel of the at least one sample image to quality scores for at least one corresponding reference pixel in an image having at least one defect.

7. A method in accordance with claim 1, further comprising applying a trained model to the residual image to determine if the second component has defects.

8. An image inspection computing device comprising:
a memory device; and
at least one processor communicatively coupled to said memory device, wherein said at least one processor is configured to:
receive at least one sample image of a first component, wherein the at least one sample image of the first component does not include defects;
receive an input image of a second component;
generate an encoded array based on the input image of the second component;
perform a stochastic data sampling process on the encoded array;
generate a decoded array from the stochastic data sampling process, based at least in part on the at least one sample image;
generate a reconstructed image of the second component, derived from the stochastic data sampling process and the decoded array, that is generated based at least in part on the at least one sample image; and
compare the reconstructed image of the second component to the input image of the second component to produce a residual image that, if the second component has defects, includes at least one difference between the reconstructed image of the second component and the input image of the second component.

9. An image inspection computing device in accordance with claim 8, wherein said at least one processor is further configured to, when comparing the reconstructed image of the second component to the input image of the second component, compare pixels of the reconstructed image of the second component with pixels of the input image of the second component.

10. An image inspection computing device in accordance with claim 9, wherein said at least one processor is further configured to calculate, based on comparing the pixels of the reconstructed image and the pixels of the input image, a similarity index that represents an estimated similarity between the pixels of the reconstructed image and the pixels of the input image.

11. An image inspection computing device in accordance with claim 10, wherein said at least one processor is further configured to generate, from the similarity index, a quality index including a quality score of at least one pixel in the residual image.

12. An image inspection computing device in accordance with claim 11, wherein said at least one processor is further configured to identify defects in the second component by identifying at least one pixel of the residual image having a quality score below a threshold value.

13. An image inspection computing device in accordance with claim 12, wherein said at least one processor is further configured to determine the threshold value by comparing quality scores for at least one reference pixel of the at least one sample image to quality scores for at least one corresponding reference pixel in an image having at least one defect.

14. An image inspection computing device in accordance with claim 12, wherein said at least one processor is further configured to determine the threshold value such that the quality score for pixels associated with relatively minor defects will be greater than the threshold value.

15. A non-transitory computer-readable storage media having computer-executable instructions embodied thereon, wherein when executed by a computing device comprising at least one processor in communication with a memory, the computer-executable instructions cause the computing device to:
receive at least one sample image of a first component, wherein the at least one sample image of the first component does not include defects;
receive an input image of a second component;
generate an encoded array based on the input image of the second component;
perform a stochastic data sampling process on the encoded array;
generate a decoded array from the stochastic data sampling process, based at least in part on the at least one sample image;
generate a reconstructed image of the second component, derived from the stochastic data sampling process and the decoded array, that is generated based at least in part on the at least one sample image; and
compare the reconstructed image of the second component to the input image of the second component to produce a residual image that, if the second component has defects, includes at least one difference between the reconstructed image of the second component and the input image of the second component.

16. A non-transitory computer-readable storage media in accordance with claim 15, wherein the computer-executable instructions further cause the computing device to, when comparing the reconstructed image of the second component to the input image of the second component, compare pixels of the reconstructed image of the second component with pixels of the input image of the second component.

17. A non-transitory computer-readable storage media in accordance with claim 16, wherein the computer-executable instructions further cause the computing device to calculate, based on comparing the pixels of the reconstructed image and the pixels of the input image, a similarity index that represents an estimated similarity between the pixels of the reconstructed image and the pixels of the input image.

18. A non-transitory computer-readable storage media in accordance with claim 17, wherein the computer-executable instructions further cause the computing device to generate, from the similarity index, a quality index including a quality score of at least one pixel in the residual image.

19. A non-transitory computer-readable storage media in accordance with claim 18, wherein the computer-executable instructions further cause the computing device to identify defects in the second component by identifying at least one pixel of the residual image having a quality score below a threshold value.

20. A non-transitory computer-readable storage media in accordance with claim 19, wherein the computer-executable instructions further cause the computing device to determine the threshold value by comparing quality scores for at least one reference pixel of the at least one sample image to quality score index values for at least one corresponding reference pixel in an image having at least one defect.

* * * * *